United States Patent [19]

Roff

[11] Patent Number: 5,764,836

[45] Date of Patent: Jun. 9, 1998

[54] PIGTAILED PACKAGE FOR AN OPTOELECTRONIC DEVICE

[75] Inventor: Robert Wallace Roff, Westfield, N.J.

[73] Assignee: The Whitaker Corporation. Wilmington, Del.

[21] Appl. No.: 665,066

[22] Filed: Jun. 11, 1996

[51] Int. Cl.⁶ .................................................... G02B 6/44
[52] U.S. Cl. .................. 385/88; 385/91; 385/49; 385/78
[58] Field of Search .......................... 385/88–91, 49, 385/52, 78, 85

[56] References Cited

U.S. PATENT DOCUMENTS

| | | | |
|---|---|---|---|
| 4,210,923 | 7/1980 | North et al. | 357/30 |
| 4,897,711 | 1/1990 | Blonder et al. | 357/74 |
| 4,961,053 | 10/1990 | Krug | 324/73.1 |
| 5,071,215 | 12/1991 | Hockaday | 385/49 |
| 5,268,635 | 12/1993 | Bortalini et al. | 324/96 |
| 5,357,103 | 10/1994 | Sasaki | 250/227 |
| 5,371,352 | 12/1994 | Yoshida | 250/208.2 |
| 5,394,490 | 2/1995 | Kato et al. | 385/14 |
| 5,412,748 | 5/1995 | Furuyama et al. | 385/88 |
| 5,420,953 | 5/1995 | Boudreau et al. | 385/88 |
| 5,479,426 | 12/1995 | Nakanishi et al. | 372/43 |

FOREIGN PATENT DOCUMENTS

| | | | |
|---|---|---|---|
| 0 208 977 | 1/1987 | European Pat. Off. | G01R 31/28 |
| 4110807 | 4/1992 | Japan | 385/49 |
| 6053552 | 5/1994 | Japan | H01L 33/00 |
| 2097550 | 11/1982 | United Kingdom | 385/52 |

OTHER PUBLICATIONS

Balliet et al., ":ow cost fiber–optic connector with integral staking", IBM technical Disclosure Bulletin, vol. 24, No. 3, Aug. 1981, pp. 1624–1626.

*IEEE Transactions On Components, Hybrids and Manufacturing Technology;* "Gigabit Transmitter Array Modules on Silicon Waferboard"; Craig A. Armiento; vol. 15; No. 6; Dec. 1992.

"1995 Proceedings 45th Electroic Components & Technology Conference–May 21–May 24, 1995"; pp. 841–845.

*Electronics Letters;* "Self–Aligned Flat–Pack Fibre–Photodiode Coupling"; Jul. 1988; vol. 24; No. 15.

PCT Inernational Search Report. International Application No. PCT/US96/02334; International Filing Date Feb. 14, 1996.

U.s. Application No. 08/674,305; "Laser/PIN Assembly With Integrated Burn–In Assembly"; Filed Jul. 1, 1996; R. Roff.

U.S. Application No. 08/414,893; "Monitor–Detector Assembly on Silicon Waferboard"; Filed Mar. 31, 1995; R. Boudreau et al.

U.S. Provisional Application No. 60/004,505; "Passively Aligned Detector Assembly"; Filed Sep. 29, 1995; R. Wilson.

U.S. Application No. 0/665,072; "Package For An Optoelectronic Device"; Filed Jun. 11, 1996; R. Roff.

*Primary Examiner*—Akm E. Ullah
*Assistant Examiner*—Ellen E. Kang
*Attorney, Agent, or Firm*—W. Francos

[57] ABSTRACT

A passively aligned high performance optoelectronic package in pigtail form which has a reduced cost over the conventional techniques of packaging by virtue of materials and alignment techniques is disclosed. The package of the present disclosure has a ferrule made of material which substantially matches the thermal characteristics of the optical bench, with the ferrule having a flat portion on one end for securing an optical fiber on a receiving group of the optical bench. The material of the ferrule is preferably kovar. Finally, passive alignment of the optoelectronic device to the fiber is effected by way of the ferrule with the flat portion of the ferrule being partially disposed in a second ferrule or sleeve prior to commitment of the sub-assembly into the final package.

19 Claims, 3 Drawing Sheets

PIGTAILED PACKAGE FOR AN OPTOELECTRONIC DEVICE

FIELD OF THE INVENTION

The present invention relates to a package for an optoelectronic device mounted on a silicon optical bench having a ferrule for securing the fiber to the silicon optical bench and a housing enclosing the silicon optical bench.

BACKGROUND OF THE INVENTION

In the realm of optoelectronics, packaging has become a crucial factor in the ability to manufacture reliable optoelectronic devices and systems. Passive alignment of a device and the subsequent packaging of the device is critical in assuring the ability to mass produce devices and systems as well as to manufacture systems and devices as at as low cost as is possible. The packaging and passive alignment of devices and systems requires a great deal of precision in order to meet the required performance characteristic. To this end, while active alignment and packaging of devices offers precision in the alignment of the device and subsequent packaging, the attendant costs in packaging, as well as the inability to produce a large quantity of devices and systems has lead to the need for a package which is precisely aligned in a passive manner.

One area of technology which holds great promise in the realm of packaging optoelectronic devices and the passive alignment of both active and passive devices in an optoelectronic system is silicon waferboard technology. In silicon waferboard technology, monocrystalline materials are used to effect the passive alignment with great precision. The use of silicon waferboard enables precision passive alignment through the use of well known and precisely defined monocrystalline planes of a monocrystalline material. One example of a subassembly for an optoelectronic device is as found in U.S. Pat. No. 4,897,711 to Blonder et al, the disclosure of which is specifically incorporated herein by reference. The reference to Blonder et al has a silicon bench on which there is formed a v-groove for the placement of an optical fiber and a selectively disposed reflective surface etched in the silicon for alignment of the optical beam to and from a fiber to a detector or from a transmitter depending on the application. This silicon bench alignment structure enables the passive alignment of the device to the fiber. Thereafter the silicon bench is disposed on a dual in line package having a lead frame mounted thereon. Finally, a cover member is disposed to encase the packaged assembly.

As can be appreciated from a study of the above reference to Blonder, et al, there is a great deal of complexity in the fabrication of the design. While the reference to Blonder does disclose some advantages in packaging gained through the passive alignment of the optical fiber to the device, there are disadvantages to such a structure as well. These disadvantages are primarily manifest in a complexity in assembly, as well as in the potential mismatch of differing materials of the subassembly which can impact greatly the performance of the device. First of all, the silicon waferboard subassembly of the invention to Blonder et al rests on a metal lead frame which is further disposed in the dual in line package as is shown in FIG. 1 of the above-referenced patent. The various parts of this assembly as disclosed in the Blonder et al reference including the dual in line package header, lead frame and cover are generally of differing material compositions. Accordingly, each material will have different thermal, expansion and contraction properties. In such a system, there is a relatively large distance between the entrance of the optical fiber to the package and the point of interaction between the fiber endface and the device. When the device heats and cools, the various members will expand and contract in differing degrees resulting in strains and stresses on the optical fiber and thereby potential misalignment of the fiber to the device. Furthermore, the assembly of such a package has attendant complexities which will increase the overall complexity of the fabrication of the packaged assembly. The optical fiber is fixed in two locations, first at the substrate preferably silicon waferboard, and at the package wall. It is therefore required to put a slight bend in the fiber to isolate the stress in the fiber from the package wall. This results in complex assembly of the final product. Additionally, alignment is done only once the package is committed to the assembly. If the alignment is poor, the package is lost along with the component, resulting in increased cost of fabrication.

Accordingly, what is desired is a less complex assembly for mounting the optical subassembly on a single material and in a package thereby reducing the costs of not only the material, but also the complexity of the fabrication and thereby the cost of the assembly. All of the above packaging and assembly techniques are performed with the intent of maximizing operating performance. There is also the need to retain the required performance through passive alignment techniques. What is needed is a package for an optoelectronic device disposed on a silicon optical bench having a v-groove in which is disposed an optical fiber. Furthermore, what is needed is a means to reduce the stress on the optical fiber that occurs in the prior art due to the relatively large distance between the entry of the optical fiber into the package and the point of mounting on the silicon optical bench. This reduction in the distance reduces the stress on the fiber due to potential thermal mismatch that can occur between the various elements of the package due to a mismatch in the thermal properties of the various materials of the package. Furthermore there is a need for a design that ruggedizes the connection of the fiber to the silicon waferboard prior to placing the assembly in the package so that any yield loss will involve the least number of parts and so reduce costs.

SUMMARY OF THE INVENTION

The present invention relates to a novel technique for mounting and packaging a passively aligned optical fiber to an optoelectronic device mounted on a silicon bench. The optoelectronic device is mounted on a silicon substrate having a v-groove for passive alignment of the optical fiber to the device. A ferrule having a bore therethrough for placement of the optical fiber is flattened on one end, this flattened portion being disposed on the top surface of the silicon optical bench for securing the optical fiber. The material of the ferrule, preferably kovar, is designed to have thermal expansion properties which closely match those of the optical bench. In this manner, thermal mismatch misalignment problems of the prior art are overcome. The kovar ferrule having the flattened portion on one end is disposed in a cylindrical ferrule portion on the other end. This cylindrical ferrule portion holds the optical fiber in secure positioning for packaging. The entire assembly, already in optical alignment, is thereafter disposed in a package of preferably plastic or ceramic. Accordingly, unlike the prior art, the present invention effects optical alignment, a relatively large factor in the overall cost of the final packaged product, prior to commitment of the subassembly into the final package. This is due of course to the fact that any yield loss will involve the least number of parts so as to reduce the overall production of costs.

The final product is a passively aligned high performance optoelectronic package in pigtail form which has a reduced cost over the conventional techniques of packaging by virtue of the materials and alignment techniques described above. One major area of cost reduction in the overall package is by virtue of an increased final yield by virtue of the packaging techniques described above. The package of the present invention can be used for both emitters and detectors; both surface and edge devices.

OBJECTS, FEATURES, AND ADVANTAGES

It is an object of the present invention to have a passively aligned pigtailed optoelectronic package having high performance characteristics and manufactured at a low cost.

It is a feature of the present invention to have a ferrule made of a material which matches substantially the thermal characteristics of the optical bench, the ferrule having a flat portion on one end for securing the optical fiber on a receiving groove of the optical bench.

It is a further feature of the present invention to effect passive alignment of the optoelectronic device to the fiber by way of the ferrule with the flat portion's being partially disposed in a second ferrule or sleeve prior to commitment of the subassembly into the final package.

It is an advantage of the present invention to have a passively aligned structure for an optoelectronic subassembly in which thermal mismatch of materials does not inhibit the alignment of the optical fiber to the optoelectronic device.

DETAILED DESCRIPTION OF THE INVENTION

Figure 1:
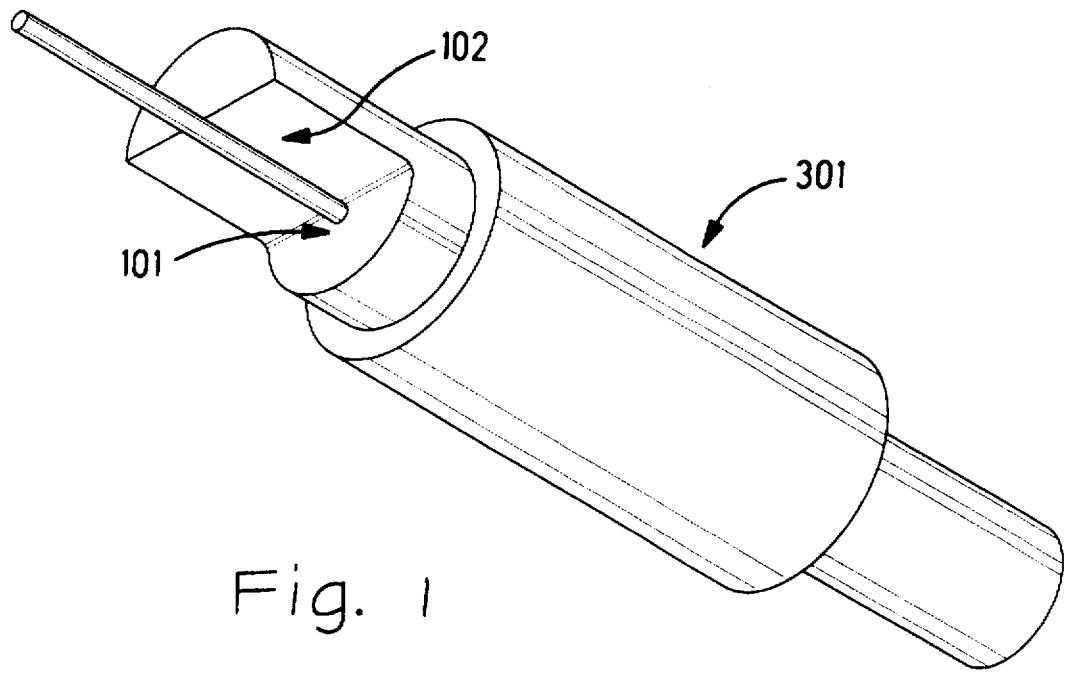
FIG. 1 is a perspective view of the ferrule having a substantially flattened portion on one end.
Figure 2A:
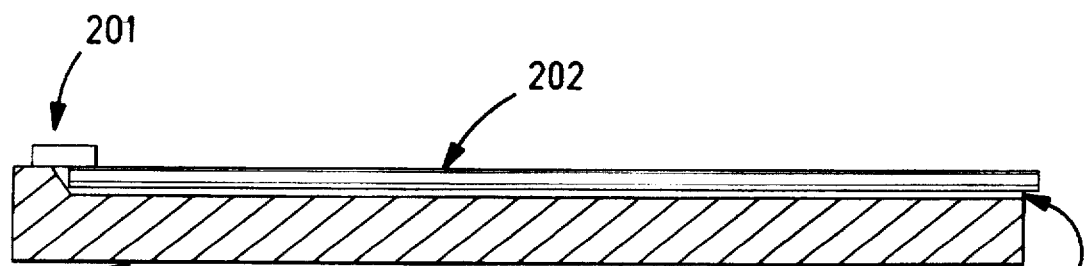
FIG. 2a is a cross sectional view of the silicon optical bench having a surface device mounted thereon.
Figure 2B:
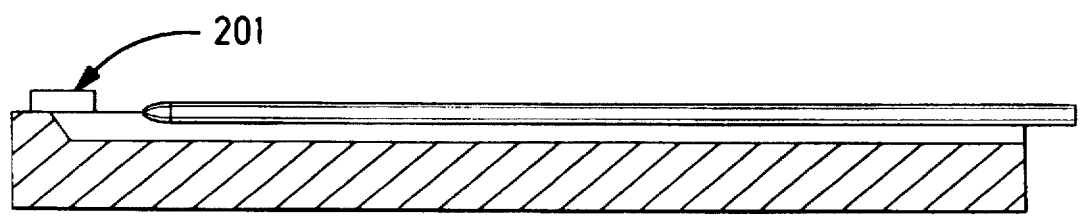
FIG. 2b is a cross section view of the silicon optical bench having an edge device mounted thereon.
Figure 2C:
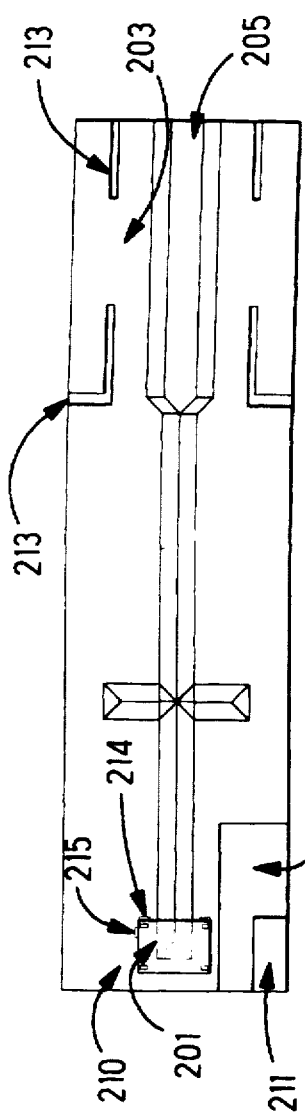
FIG. 2c is a plan view of the silicon waferboard.
Figure 4:
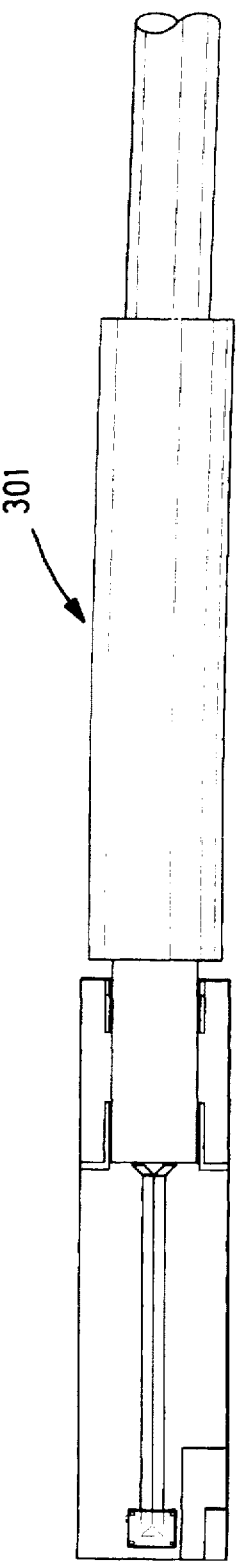
FIG. 4 is a top view of the subassembly shown in FIG. 3.
Figure 3:
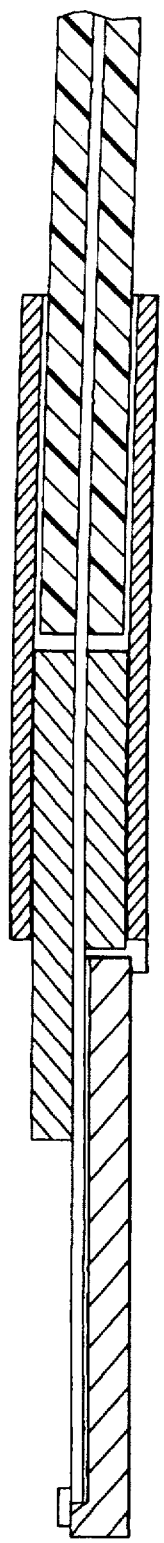
FIG. 3 is a cross sectional view of the subassembly having the silicon optical bench the flat ferrule portion and the ferrule for holding the optical fiber and the ferrule having the flattened portion.
Figure 6:
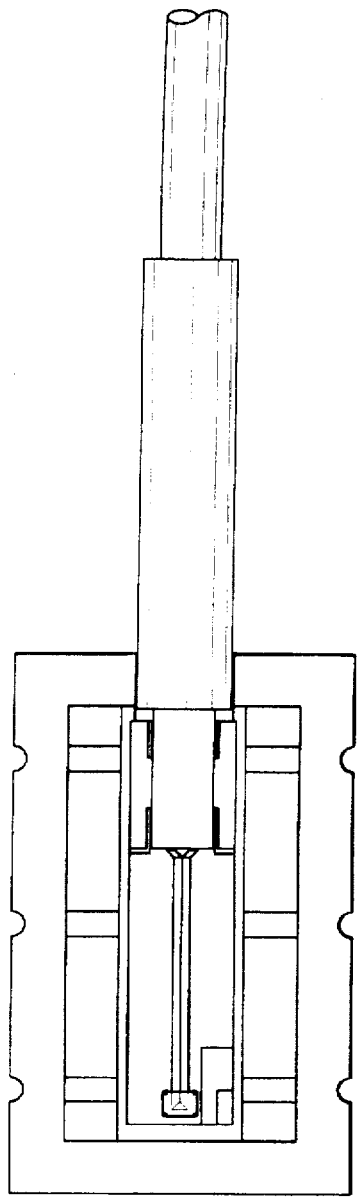
FIG. 6 is a top view of the package shown in FIG. 5.
Figure 5:
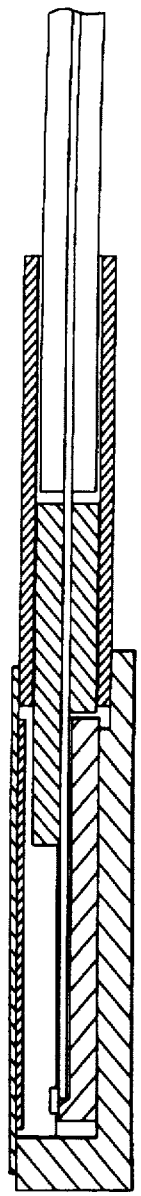
FIG. 5 is a cross sectional view of the package mounted in the package.

Turning to FIG. 1, the ferrule 100 is shown having a bore 101 therein for reception of the optical fiber. The surface 102 is substantially flat at the first end of the ferrule. The material for the ferrule 100 is preferably kovar which is chosen to have a thermal characteristic which most closely matches the silicon bench substrate. Clearly, it is the thermal matching of the various coefficients of expansion of the ferrule and the optical bench of the subassembly which is important in the present invention. Accordingly, other materials can be used for the ferrule and the optical bench in order to effect the present invention. As stated, the preferable material is kovar and the flat portion of the ferrule 102 is effected as follows. A wire is used in standard electrostatic discharge machining (EDM) techniques to cut the substantially cylindrical ferrule along the desired lines to effect the flat surface 102 WIRE EDM is the preferable technique in that by such method the small bore is not closed by metal burrs typical with other methods of manufacture. Turning to FIG. 2a, a typical arrangement for a surface device 201 (for example a pin diode photodetector or VCSEL) mounted on a optical bench 200 preferably of silicon is effected. The optical fiber 202 is disposed in a v-groove etched into the silicon optical bench by standard techniques as is disclosed in U.S. Pat. No. 4,210,923 to North et al. a disclosure of which is specifically incorporated herein by reference. Clearly, the packaged device of the present invention could be a detector in which the v-groove would be etched so that the fiber mounted therein transmits light upon reflection from a surface in the silicon optical bench to the lower surface of the detector. Such an alignment of a fiber to a detector is as disclosed in U.S. Provisional Application and U.S. patent applications (60/004,505 and 08/665,072) and U.S. Pat. Nos. 5,617,036 and 5,694,048 the disclosures of which are specifically incorporated herein by reference. Alternatively, as shown in FIG. 2b should the device be an edge emitting source such as a laser or LED the alignment of the endface of the fiber is effected through standard techniques known in the silicon waferboard art. The silicon optical bench shown in top view at FIG. 2c has a selected region 203 for reception of the flat portion of the ferrule 102. The receiving groove 205 cooperates with the flat portion of the ferrule to secure the fiber. Furthermore, the receiving groove 205 allows for placement mismatch of the flat portion of the ferrule relative to the v-groove to ease assembly tolerances. The substrate has a ground plane on its surface as shown at 210. The anode connection for the device is at 211 separated from the ground by an oxide 212. Finally, marking 213 are of metal or oxide to allow for visual placement of the flat portion of the ferrule. The device is passively aligned to the v-groove and thus the fiber by use of silicon alignment pedestals and standoffs 214, 215 by techniques as disclosed in U.S. patent applications and Provisional Applications (08/379,778, 60/010,913, 60/010,870 and 08/771,593, now abandoned) the disclosures of which are specifically incorporated herein by reference. The optical fiber having been disposed in the bore of the ferrule 100 protrudes across the surface 102 and is disposed in the v-groove etched in the optical bench at 204. The alignment of the optical fiber to the device is effected by the placement of the fiber in the v-groove and is secured in place by the flat portion of the ferrule. This is shown clearly in cross section in FIG. 3 and in top view in FIG. 4. Thereafter, the optical ferrule or sleeve 301 disposed about the optical ferrule 100 effects the subassembly having the fiber aligned to the device and securely disposed in a subassembly by way of the flat portion of the ferrule and receiving groove 205. It is of interest to note at this point that the optical fiber disposed in the v-groove secured throughout the subassembly is not susceptible to thermal mismatch expansion problems which produce strain on the fiber in the prior art thereby effecting possible misalignment of the fiber to the device. The entire subassembly having been prepackaged and aligned is thereafter disposed in the final package as is shown in cross section in FIG. 5 and in top view in FIG. 6. This package as shown in FIG. 5 at 501 is preferably plastic or ceramic. Electrical connections therebetween are effected as shown at 601 by know wire bond practices. This final step in placement of the subassembly into the final package improves the yield of the final assembly of devices in manufacturing by not committing the subassembly to the final package until after necessary alignment is effected.

This overcomes the drawback of the prior art whereby final packaging is effected prior to alignment and thereby commitment to the final package. Should misalignment occur at this point in the prior art, the entire final package would be discarded increasing greatly the overall cost of manufacture through a loss yield at this final step.

Clearly, depending on the application of the packaged assembly, certain aspects must be altered. Should the device be a source such as a laser in the package, it is important to effect a tapered lens to the fiber to effect proper coupling from the device to the fiber. This is done by standard techniques known well to the one of ordinary skill in the art. Should the device be a detector, the fiber end face is polished or cleaved at an angle; typically about 8° to prevent back reflection from this surface as well as proper coupling of the fiber to the detector. One important aspect of the present invention is effected by the ferrule member 100. To this end the piece of kovar 100 having the flat portion is fabricated in such a manner so as to orient the angle cleave on the endface of the fiber in the v-groove such that the emittion of radiation from the fiber is impinged on the detector without need to rotate the fiber in the v-groove.

As stated above, the present invention has the attendant advantages of passive alignment of an optical fiber to an optoelectronic device through a silicon optical bench. The package of the present invention enables a simple design with relatively few parts for packaging the device. Furthermore, a major advantage of the present invention lies in the effect that an optical ferrule having a flat portion for securing an optical fiber in a v-groove of silicon overcomes thermal mismatch problems attendant in the prior art which tend to induce stress on the fiber and potentially misalignment of the fiber to the device. While the prior art does attempt to overcome this through prestressing the fiber, this increases the complexity of manufacture and thereby increases the cost of manufacture. Furthermore, the simplicity of design of the present invention enables a very low cost assembly and package for an optoelectronic system without sacrificing the performance of the device in the package.

The invention having been described it is clear that certain modifications in variations of the ferrule having a flat portion for securing an optical fiber in a v-groove which passively aligns the fiber to an optoelectronic device mounted on the optical bench are possible to one of ordinary skill in the art. Such prealignment of the optical fiber to the optoelectronic device disposed on the optical bench will effect a final passive alignment of the device prior to commitment to a final package is the thrust of the invention and to the extent that modifications of materials and alignment techniques can be effected within the teaching of the present disclosure such modifications and variations are deemed to be within the scope of the present invention.

I claim:

1. A package for an optoelectronic device having a substrate on which is disposed an optoelectronic device; a groove for receiving an optical fiber and a housing encasing said substrate and a portion of said fiber, characterized in that:

a known ferrule having a substantially flat portion on one end secures said fiber to said, said substrate being a monocrystalline material substrate.

2. A package as recited in claim 1, further characterized in that:

said substrate has a receiving groove for cooperatively engaging said fiber with said flat portion of said ferrule.

3. A package as recited in claim 2 further characterized in that:

said ferrule is further disposed in another ferrule on an end opposite said one end of said ferrule.

4. A package as recited in claim 2 further characterized in that:

said groove and said receiving groove have sidewalls in defined crystalline planes.

5. A package as recited in claim 4 further characterized in that:

a reflective surface is disposed at an end of said groove, and said optoelectronic device is a photodetector disposed above said reflective surface.

6. A package as recited in claim 1 further characterized in that:

said optoelectronic device is a laser.

7. A package for an optoelectronic device having a monocrystalline substrate on which is disposed the optoelectronic device; a groove for receiving an optical fiber on said substrate and a housing encasing said substrate and a portion of said optical fiber; and a known ferrule for receiving said optical fiber, said ferrule having a flat portion on one end for securing said fiber to said substrate.

8. A package as recited in claim 7 further comprising another ferrule disposed about said ferrule at an end opposite said flat portion.

9. A package as recited in claim 7 wherein said groove has sidewalls in well-defined crystalline planes.

10. A package as recited in claim 7 wherein said groove has a reflective surface on one end and said optoelectronic device is a photodetector disposed above said reflective surface.

11. A package as recited in claim 7 wherein said groove passively aligns said fiber to said optoelectronic device so that light is within the acceptance angle of said fiber.

12. A package as recited in claim 11 wherein said optoelectronic device is a light emitter.

13. A package as recited in claim 12 wherein said light emitter is an LED.

14. A package as recited in claim 7 wherein said substrate further comprises a receiving groove, said receiving groove cooperatively engaging said fiber with said flat portion of said ferrule.

15. A package as recited in claim 12, wherein said ferral is kovar.

16. A package for an optoelectronic device, having an optical bench on which is disposed the optoelectronic device; a groove for receiving an optical fiber on said optical bench and a housing encasing said optical bench and a portion of said optical fiber;

and a ferrule for receiving said optical fiber, said ferrule having a flat portion on one end for securing said fiber to said optical bench substrate, said ferrule and said optical bench having thermal expansion properties which substantially match one another so as to overcome thermal mismatch misalignment problems.

17. A package as recited in claim 12, wherein said optical bench is made of a monocrystalline material.

18. A package as recited in claim 16, wherein said optoelectronic device is a light emitting device.

19. A package as recited in claim 16, wherein said optoelectronic device is a photodetector.

* * * * *